(12) United States Patent
Chen (10) Patent No.: US 11,984,738 B2
(45) Date of Patent: May 14, 2024

(54) CHARGING CONTROL METHOD, ELECTRONIC DEVICE AND STORAGE MEDIUM

(71) Applicant: BEIJING XIAOMI MOBILE SOFTWARE CO., LTD., Beijing (CN)

(72) Inventor: Chaoxi Chen, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 400 days.

(21) Appl. No.: 17/357,777

(22) Filed: Jun. 24, 2021

(65) Prior Publication Data
US 2022/0302721 A1 Sep. 22, 2022

(30) Foreign Application Priority Data
Mar. 19, 2021 (CN) .......................... 202110296525.4

(51) Int. Cl.
*H02J 7/00* (2006.01)
(52) U.S. Cl.
CPC ...... *H02J 7/00034* (2020.01); *H02J 7/00714* (2020.01); *H02J 7/007182* (2020.01)
(58) Field of Classification Search
CPC ............. H02J 7/00034; H02J 7/007182; H02J 7/00714
See application file for complete search history.

(56) References Cited

U.S. PATENT DOCUMENTS

2003/0139136 A1* 7/2003 Pattabiraman ........ H04L 1/0007
455/504
2017/0324278 A1* 11/2017 Chao ....................... H02J 50/40

FOREIGN PATENT DOCUMENTS

| CN | 107546804 A | * | 1/2018 | |
| CN | 108879896 B | * | 12/2020 | ............. H02J 50/12 |
| KR | 20160015613 A | | 2/2016 | |
| KR | 20170020144 A | | 2/2017 | |
| WO | WO 2008054035 A1 | | 5/2008 | |
| WO | WO 2018184569 A1 | | 10/2018 | |

OTHER PUBLICATIONS

Machine translation for CN-107546804-A (Year: 2017).*
"DA4100 WhattUp® Wireless Power Transmitter" Dialog Semiconductor (2019) (hereinafter "Dialog") (Year: 2019).*
Claire "USB-C vs. Lightning: Which is the Future?" Mar. 26, 2020 (Year: 2020).*
Machine translation for CN-108879896-B (Year: 2018).*
Indian Patent Application No. 202144028924, Office Action dated Oct. 12, 2022; 6 pages.

* cited by examiner

*Primary Examiner* — Drew A Dunn
*Assistant Examiner* — Pamela J Jeppson
(74) *Attorney, Agent, or Firm* — COZEN O'CONNOR (57) ABSTRACT

The present disclosure relates to a charging control method applicable for a first terminal. The method includes: monitoring a Bluetooth communication state between the first terminal and the second terminal in a process of charging the first terminal. When the Bluetooth communication state is monitored to be in an abnormal state, the charging power for charging the first terminal is adjusted reduced based on the charge protocol supported by the first terminal.

18 Claims, 6 Drawing Sheets

CHARGING CONTROL METHOD, ELECTRONIC DEVICE AND STORAGE MEDIUM

CROSS REFERENCE TO RELATED APPLICATION

This application is based on and claims priority to Chinese Patent Application No. 202110296525.4, filed on Mar. 19, 2021, the entire content of which is hereby incorporated by reference.

TECHNICAL FIELD

The present disclosure relates to a field of communication technologies, especially to a charging control method, an electronic device and a storage medium.

BACKGROUND

In related arts, a terminal is charged based on a charging power limited in a charge protocol when charging. The charging power included in the charge protocol belongs to a large-power and high-voltage charge protocol to ensure that the terminal may quickly complete charging.

SUMMARY

According to a first aspect of the embodiment of the present disclosure, a charging control method is provided, which is applicable for a first terminal. The method includes: monitoring a Bluetooth communication state between the first terminal and the second terminal in a progress of charging the first terminal. When the Bluetooth communication state is monitored to be in an abnormal state, a charging power for charging the first terminal is adjusted based on a charge protocol supported by the first terminal.

According to a second aspect of the embodiment of the present disclosure, an electronic device is provided. The electronic device includes: a memory, configured to store instructions; and a processor, configured to call the instructions stored in the memory to execute a charging control method, and the processor is configured to: monitor a Bluetooth communication state between a first terminal and a second terminal in a progress of charging the first terminal; when the Bluetooth communication state is monitored to be in an abnormal state, adjust a charging power for charging the first terminal based on a charge protocol supported by the first terminal.

According to a third aspect of the embodiment of the present disclosure, a computer readable storage medium with instructions stored thereon is provided. The c instructions execute a charging control method, and the method includes: monitoring a Bluetooth communication state between a first terminal and a second terminal in a progress of charging the first terminal; when the Bluetooth communication state is monitored to be in an abnormal state, adjusting a charging power for charging the first terminal based on a charge protocol supported by the first terminal.

It should be noted that, the details above and as follows are exemplary and illustrative, and do not limit the present disclosure.

BRIEF DESCRIPTION OF THE DRAWINGS

The drawings herein are incorporated into the specification and constitute a part of the specification, show embodiments in conformity with embodiments of the present disclosure, and explain the principle of the present disclosure together with the specification.

DETAILED DESCRIPTION

The example embodiments will be described in detail here, and examples thereof are shown in the accompanying drawings. When the following descriptions refer to the accompanying drawings, unless otherwise indicated, the same numbers in different drawings represent the same or similar elements. The implementations described in the following example embodiments do not represent all the implementations consistent with the present disclosure. Rather, they are merely examples of the apparatus and method consistent with some aspects of the present disclosure as detailed in the appended claims.

The charging control method in the embodiment of the present disclosure may be applicable for a scenario where a first terminal performs Bluetooth communication with the second terminal during a charging process. The first terminal may play audio files and make voice communication based on Bluetooth communication with the second terminal, which is introduced by taking the scenario where the first terminal and the second terminal plays a media file through the Bluetooth communication.

Figure 1:
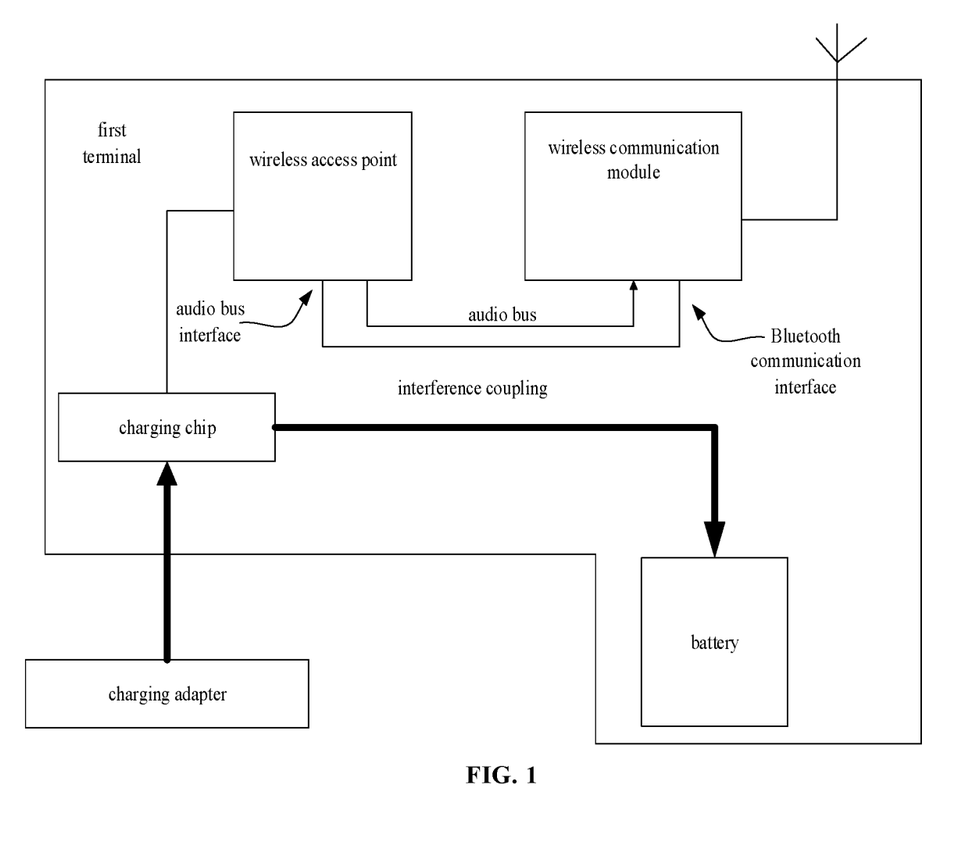
FIG. 1 is a schematic diagram illustrating a charging interference audio path according to an embodiment of the present disclosure.

For example, a schematic diagram of a charging interference audio path is illustrated in FIG. 1. In a process of charging the first terminal through a charge adapter, a high voltage is stored in a battery of the first terminal through a Charge-Integrated Circuit Chip (also refers to as Charge IC) interface. During the process of the first terminal and the second terminal playing the media file using the Bluetooth communication, a Wireless Access Point (also referred to as AP) is connected to a Bluetooth communication interface through a media bus interface, such as a Serial Low-power Inter-chip Media Bus (also referred to as SlimBus) interface, and establishes the Bluetooth communication with the second terminal based on a wireless communication technology, and the media file in the first terminal is transmitted through the SlimBus interface in the first terminal to the second terminal for playing based on the Mobile Industry Processor Interface (MIPI) protocol. Therefore, playing the media file through the second terminal may be realized. The SlimBus interface may also be referred to as a low power chip serial media interface. The MIPI protocol is an open standard and a specification established for mobile application processors and initiated by MIPI Alliance. During a transmission process, a communication voltage of the SlimBus interface may be relatively low.

However, based on a circuit distribution inside the terminal and a position relationship between an output path of a charging chip and the Bluetooth communication interface, in a process of the first terminal being charged, and performing media file playing based on the Bluetooth communication with the second terminal, a signal generated by high voltage passing through the by the output path of the charging chip is in an up-down overlap state with a signal passing through the Bluetooth communication interface. A fluctuation of a high voltage generated during charging attracts electrons of the up-down overlapping signal based on an electric field force, to cause a voltage between the AP and the Bluetooth communication interface to be interfered, that is, an interference coupling phenomenon generates, which result in increasing of a communication voltage in the SlimBus interface, and affects the Bluetooth communication between the first terminal and the second terminal, and further affects the playing state of the media file and user experience.

In view of this, the present disclosure provides a charging control method, capable of determining the Bluetooth communication state between the first terminal and the second terminal by monitoring the Bluetooth communication state between the first terminal and the second terminal in real time in the process of charging the first terminal. When the communication state is abnormal, the charging power for charging the first terminal is adjusted timely to ensure that normal Bluetooth communication between the first terminal and the second terminal may be performed during process of charging the first terminal. In one example, a type of the first terminal or the second terminal may include a mobile terminal, such as a mobile phone, a tablet, a notebook. In another example, a structure of the first terminal or the second terminal may include a double-sided screen terminal, a folded screen terminal, a full-screen terminal, etc. In another example, a type of the second terminal may also include a terminal that may play a media file, such as a Bluetooth headset, a media player.

In one embodiment, when the first terminal is in a process of being charged, and performs media file playing based on the Bluetooth communication with the second terminal, the Bluetooth communication state between the first terminal and the second terminal is monitored in real time, and a playing condition of the media file may be determined. When the Bluetooth communication state between the first terminal and the second terminal is monitored to be in an abnormal state, the charging power for charging the first terminal may be adjusted timely to ensure that in the process of charging the first terminal the normal Bluetooth communication may be performed between the first terminal and the second terminal, and the media file may be played normally.

Figure 2:
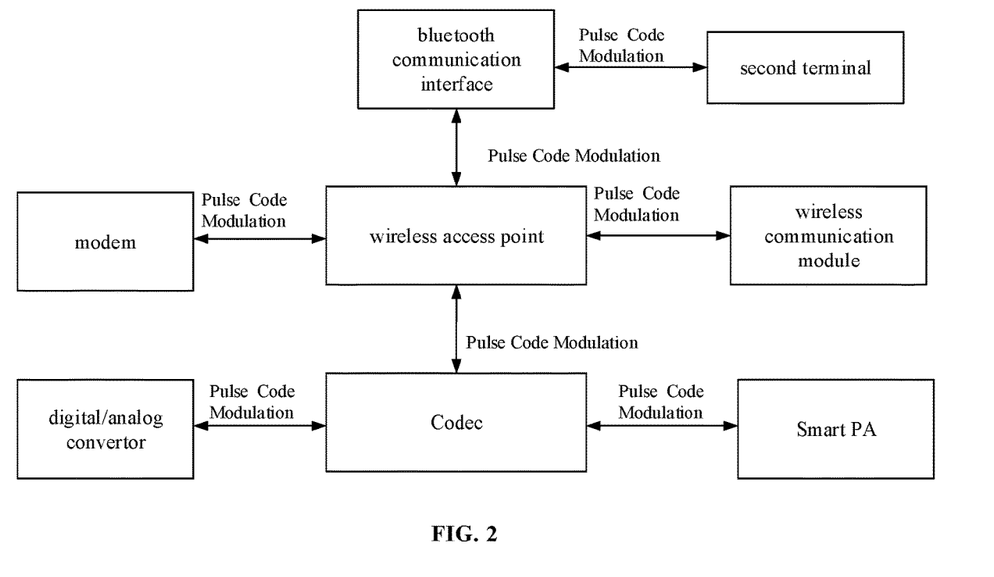
FIG. 2 is a schematic diagram illustrating an architecture of a terminal audio path circuit according to an embodiment of the present disclosure.

In another embodiment, an audio path circuit in the first terminal may be illustrated in FIG. 2. FIG. 2 is a schematic diagram illustrating an architecture of a terminal audio path circuit according to an embodiment of the present disclosure. The terminal audio path circuit at least includes various kinds of hardware as follows: a Wireless Access Point (AP), a Modem, a wireless communication module, a Digital/Analog Convertor (DAC), a Codec and a smart PA. The Modem may translate digital signals of a computer into pulse signals that may be transmitted through an ordinary telephone line, and the pulse signals may be received by another Modem at the other end of the line and translated into a computer understandable language. A DAC, also referred to as a D/A converter, is a device that may convert digital quantities into analog quantities. A Codec is a device with coding and decoding functions in digital communication. A smart PA is a kind of amplifier. In various hardware, a Pulse Code Modulation (PCM) is adopted for data interactions. The PCM is a modulation mode that may sample, quantize and code a continuously changing analog signal. The AP establishes a Bluetooth communication connection with the second terminal based on the wireless communication module through a Bluetooth communication interface, and then transmits an audio to the second terminal for playing by the second terminal. The Codec may be connected to a microphone (MIC) interface. The MIC interface includes a Main interface and a sub deep bass output interface for outputting a primary channel and a deep bass in the audio. The smart PA may be connected to a speaker (SPK). It should be noted that the above circuits are only configured for reference, and the internal circuit distribution settings of the terminal are not limited in the present disclosure. In one example, the Modem may be provided in the wireless communication module. In another example, the DAC may be provided in the Codec.

Figure 3:
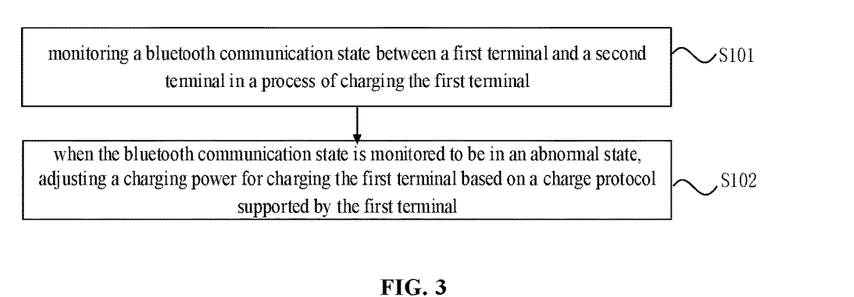
FIG. 3 is a flowchart illustrating a charging control method according to an embodiment of the present disclosure.

FIG. 3 is a flowchart illustrating a charging control method according to an embodiment of the present disclosure. As illustrated in FIG. 3, the charging control method is applicable for a first terminal, which includes the following blocks.

At block S101, a Bluetooth communication state between a first terminal and a second terminal is monitored in a process of charging the first terminal.

In the embodiment of the present disclosure, the first terminal and the second terminal may establish a communication connection, and when playing the media file, the first terminal may play the media file through the second terminal based on the communication connection with the second terminal. The media file may include an audio file such as a music file, or a recording file, which is not limited in the present disclosure.

Based on the foregoing, in the process of charging the first terminal, when the media file is played through the second terminal based the Bluetooth communication between the first terminal and the second terminal, the Bluetooth communication between the first terminal and the second terminal is easily interfered, caused the Bluetooth communication not to be performed normally between the first terminal and the second terminal, which may affect a playing condition of the media playing and causes the playing state to be in the abnormal state. For example, there may exist incoherently playing, noise or playing interruption during the process of playing the media file. In order to ensure that the media file is normally played by the second terminal in the process of charging the first terminal, the first terminal responds according to playing the media file based on the Bluetooth communication with the second terminal in the process of charging, and monitors the playing state of the media file in real time, so that abnormally playing of the media file may be found timely, and the process of charging the first terminal may be modulated timely.

At block S102, when the Bluetooth communication state is monitored to be in an abnormal state, the charging power for charging the first terminal is adjusted based on a charge protocol supported by the first terminal.

In the embodiment of the present disclosure, when the Bluetooth communication state between the first terminal and the second terminal is monitored to be in the abnormal state, it indicates that coupling interference between an output path of a current Charge IC interface and the SlimBus interface easily affects the normal Bluetooth communication between the first terminal and the second terminal. Therefore, when the Bluetooth communication state between the first terminal and the second terminal is monitored to be in the abnormal state, the charging power for charging the first terminal is adjusted based on the charge protocol supported by the first terminal, to reduce an influence of the coupling interference between the output path of the current Charge IC interface and the SlimBus interface. Thus, the normal Bluetooth communication between the first terminal and the second terminal may be guaranteed, and a stability of transmission of the media file is enhanced, further the user experience is improved. For example, the charging power for charging the first terminal may be adjusted in a manner that reduces the charging power for charging the first terminal.

In one example, when the Bluetooth communication state is monitored in the normal state based on the monitoring of the first terminal, it indicates that coupling interference between the output path of the current Charge IC interface and the SlimBus interface is not enough to affect the normal Bluetooth communication between the first terminal and the second terminal. Therefore, when the Bluetooth communication state is monitored in the normal state, it is not required to adjust the charging power for charging the first terminal.

In the above embodiment, in the process of charging the first terminal, the first terminal may determine the Bluetooth communication state between the first terminal and the second terminal by monitoring the playing state of the media file. When the Bluetooth communication state between the first terminal and the second terminal is monitored in the abnormal state, the charging power is timely reduced based on the charge protocol supportable by the first terminal, to guarantee the Bluetooth communication state between the first terminal and the second terminal to be in the normal state. Further, the interference of the charging power on Bluetooth communication is reduced, the media file may be played normally, and the user experience is improved.

In one embodiment, the charging power threshold is a charging power corresponding to the Bluetooth communication state between the first terminal and the second terminal being in a normal state before switched to the abnormal state from the normal state. The AP may include an AP detection protocol, which may determine a current charge protocol adopted when the first terminal is currently charged, and one or more charging powers included in the current charge protocol, so as to determine whether the current charge protocol supports to adjust the charging power for charging the first terminal to the first charging power. When the charging power for charging the first terminal is adjusted, the charge protocol supporting the first charging power in the first terminal is determined based on the charge protocol supported by the first terminal. The charging power for charging the first terminal is adjusted to the first charging power smaller than the charging power threshold during adjustment, and the charge protocol corresponding to the first charging power is adopted to charge, so as to avoid or reduce the interference of the charging power on the Bluetooth communication in the process of charging. The charge protocol may include a charge protocol supporting a plurality of voltage classes or a programmable quick charge protocol.

The charge protocol is implemented by change states of a level signal between D+ and D-, and the charging power enters the Charge IC through a VBUS. A VBUS wire is a power supply wire supplied power by a Host Hub to a USB device. The AP detects the charge protocol and controls the charge IC to control the charging power through the usb interface in the terminal.

In one example, the charge protocol supporting a plurality of voltage classes may include a Quick Charge 2.0 (qc2.0) protocol or a qc 3.0 protocol. In another example, a programmable quick charge protocol may include a power delivery (PD) protocol. The PD protocol may implement to increase a type-c interface with a default maximum power 5 V 2 A to 100 W.

The qc 2.0 protocol may support the voltage class with high voltage charging or large current charging, which may include classA (5 Volts (V), 9V, 12V) and classB (5V, 9V, 12V, 20V). The output voltage of the Charge adapter is controlled based on the change of the level signal between D+ and D-, and the charging current may be increased from 500 mA to 3A, and a maximum charging power may be 60 Watts (W) (20V/3 A). A relationship among D+, D- and the output voltages of the Charge adapter may be as illustrated in Table 1 below. Table 1 is a voltage comparison table according to an embodiment. The qc 3.0 protocol includes a built-in temperature control module, which may be compatible with a qc 2.0 protocol and a BC1.2 protocol. The qc 3.0 protocol adopts an Intelligent Negotiation for Optimum Voltage (INOV) technology to regulate the charging voltage by 200 millivolts/step (MV/STEP), which may effectively reduce a heat loss. The BC 1.2 protocol includes a plurality of charging modes, such as a SDP, a DCP, and a CDP. When the SDP mode indicates that the charger currently adopted for charging is a non-standard charger, the charger may support a charging voltage with 5v and a charging current with maximum 500 mA, and may communicate by using USB 2.0. When the DCP mode indicates that the charger currently adopted for charging is a dedicated charger, the charger may support a charging voltage with 5v and a charging current with 1.5 A, but may not communicate by using USB 2.0. When the CDP mode indicates that a port currently adopted for charging is a port for large current charging, the port may support a charging voltage with 5v and a charging current with maximum 1.5 A, and may communicate by using USB 2.0.

TABLE 1

| D+ level signal | D- level signal | Output voltage |
| --- | --- | --- |
| 0.6 v | 0 v | 5 v |
| 3.0 V (above) | 0.6 v | 9 v |
| 0.6 v | 0.6 v | 12 v |
| 0.6 v | 3.0 V (above) | 20 v |

In one embodiment, priority levels for a charging detection sequence of the AP detection charge protocols may be: a PD Protocol>a USB Type-C, 3 A Protocol>a USB Type-C, 1.5 A Protocol>a BC1.2 Protocol>a USB 3.1 Protocol>a USB 2.0 Protocol. The USB Type-C, 3 A protocol refers to a charge protocol with a charging voltage of 5V and a charging current of 3.0 A. The USB Type-C, 1.5 A protocol refers to a charge protocol with a charging voltage of 5V and a charging current of 1.5 A. The USB 3.1 protocol refers to a charge protocol with a charging voltage of 5V and a charging current of 900 mA. The USB 2.0 protocol refers to a charge protocol with a charging voltage of 5V and a charging current of 500 mA. When the first terminal is charged through the charger, the first terminal and the charger scan each other for the charge protocol supported by the other, and charge based on the charge protocol commonly supported by both sides. Before the first terminal is charged by the charger, the charge protocol commonly supported by both sides may be traversed from low to high of the priority levels according to the charging detection sequence, and the charge protocol with a maximum charging power or a highest charging voltage is selected to charge the first terminal. For example, the charge protocols commonly supported by both sides include: the PD protocol, the USB Type-C, 3 A protocol, the USB Type-C, 1.5 A protocol and the USB 2.0 protocol. Before the charger charges the first terminal, the traversal starts from the USB 2.0 protocol, goes through the USB Type-C,1.5 A protocol, the USB Type-C, 3 A protocol until to the PD protocol successively based on the above charging detection sequence. When the charging power corresponding to the PD protocol is the largest or the largest in parallel in the charging powers supported by four charge protocols, the first terminal is charged based on the charging power corresponding to the PD protocol. When the charging power corresponding to the PD protocol is lower than a charging power corresponding to the USB Type-C, 3 A protocol, the first terminal is charged based on the charging power corresponding to the USB Type-C,3 A protocol.

In one example, when the current charge protocol supports to adjust the charging power for charging the first terminal to the first charging power, the charging power for charging the first terminal is adjusted to the first charging power based on the current charge protocol without switching the current charge protocol. The interference of the charging power on Bluetooth communication in the process of charging may be avoided or reduced.

In another example, when the current charge protocol does not support to adjust the charging power for charging the first terminal to the first charging power, it is determined that the charge protocol supporting the first charging power may be determined based on the charging detection sequence corresponding to the charge protocol supported by the first terminal. The current charge protocol is switched to a charge protocol supporting the first charge power, and based on the charge protocol supporting the first charge protocol, the charging power for charging the first terminal is adjusted to the first charging power. The interference of the charging power on Bluetooth communication in the process of charging may be avoided or reduced.

In another example, when the charging power corresponding to the charge protocol charging for the terminal is relatively high, the present charge protocol employed during currently charging of the first terminal may be adjusted in a manner of reducing a switching rate of charging and adjusting a rising edge of the level signal between D+ and D-. The charging power for charging the first terminal is adjusted to the first charging power. The interference of ultra-harmonics generated in the process of charging on the Bluetooth communication.

In an embodiment, when the current charge protocol is a charge protocol supporting a plurality of voltage classes, and the charge protocol supporting the plurality of voltage classes includes a first charging power, the voltage class may be fixed to a voltage class corresponding to the first charging power, and the first terminal is charged. When it is determined that the current charge protocol is the charge protocol supporting the plurality of voltage classes through the AP, whether the voltage class corresponding to the first charging power is included may be determined according to the charging power corresponding to each voltage class in the charge protocol. After it is determined that the first charging power is included, the voltage class in the charge protocol may be adjusted to the voltage class corresponding to the first charging power. The first terminal is charged by adopting the voltage class corresponding to the first charging power, and then the charging power is reduced without affecting a charging rate of the first terminal.

In another embodiment, when the charge protocol is the programmable quick charge protocol, the charging power for charging the first terminal is adjusted to the first charging power in a manner of reducing the charging voltage of the first terminal to a first charging voltage, or reducing the charging current for charging the first terminal to a first charging current, or, reducing the charging voltage of the first terminal to the first charging voltage and the charging current of the first terminal to the first charging current. When it is determined that the charge protocol employed by the first terminal is the programmable quick charge protocol through the AP, it indicates that the charging voltage or the charging current for charging the first terminal may be adjusted under the charge protocol. In order to avoid the interference on the normal Bluetooth communication between the first terminal and the second terminal during charging, the charging voltage, or the charging current or the charging voltage and the charging current of the first terminal may be reduced, to achieve a purpose of reducing the charging power. The Bluetooth communication between the first terminal and the second terminal is guaranteed, and the media file may be smoothly transmitted to the second terminal for playing.

In one example, when the charging voltage is reduced, the charging voltage may be reduced to the first charging voltage. The first charging voltage is less than a charging voltage threshold. The charging voltage threshold is a charging voltage corresponding to the Bluetooth communication state between the first terminal and the second terminal being in the normal state before switched to the abnormal state from the normal state. It may be understood that, a charging voltage threshold is a maximum charging voltage threshold that does not affect operations of the first terminal or the Bluetooth communication between the first terminal and the second terminal.

In one example, when the charging current is reduced, the charging current may be reduced to a first charging current, in which the first charging current is less than a charging current threshold. The charging current threshold is a charging current corresponding to the Bluetooth communication state between the first terminal and the second terminal being in the normal state before switched to the abnormal state from the normal state. It may be understood that, a charging current threshold is a maximum charging current threshold that does not affect operations of the first terminal or the Bluetooth communication between the first terminal and the second terminal.

In another example, the charging voltage and the charging current of the first terminal may be reduced simultaneously so that the adjusted charging power is less than a charging power threshold. It may be understood that, a charging power threshold is a maximum charging power threshold that does not affect operations of the first terminal or the Bluetooth communication between the first terminal and the second terminal.

Figure 4:
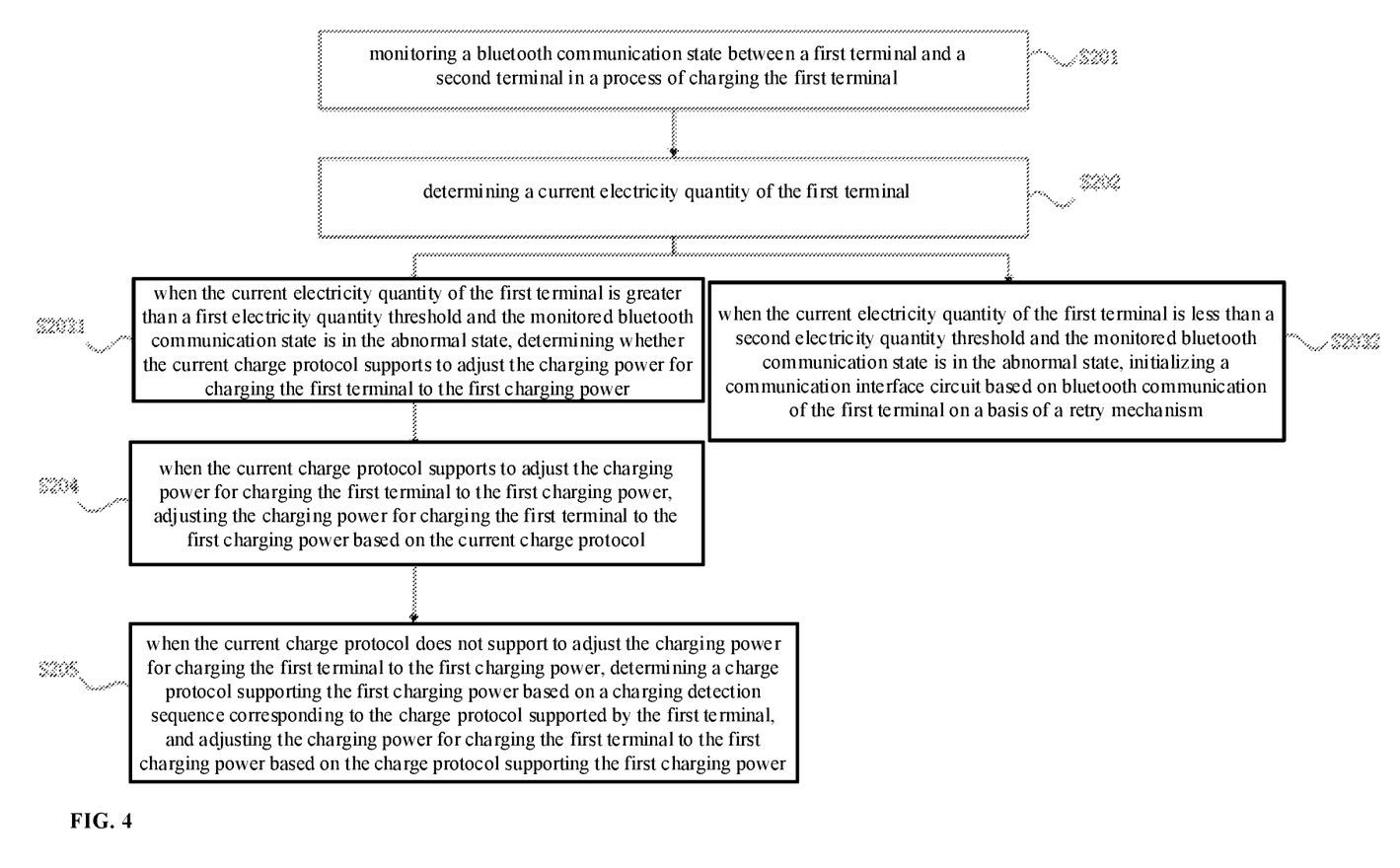
FIG. 4 is a flowchart illustrating a charging control method according to another embodiment of the present disclosure.

In another embodiment, as illustrated in FIG. 4, whether the charging power for charging the first terminal requires to be adjusted further depends on a current electricity quantity of the first terminal. FIG. 4 is a flowchart illustrating a charging control method according to another example embodiment.

At block S201, the Bluetooth communication state between the first terminal and the second terminal is monitored in the process of charging the first terminal.

At block S202, the current electricity quantity of the first terminal is determined.

At block S2031, when the current electricity quantity of the first terminal is greater than a first electricity quantity threshold and the monitored Bluetooth communication state is in the abnormal state, it is determined whether the current charge protocol supports to adjust the charging power for charging the first terminal to the first charging power.

In the embodiment of the present disclosure, the first electricity quantity threshold is configured to determine whether the current electricity quantity of the first terminal is a relatively high electricity quantity. When the current electricity quantity is greater than the first electricity quantity threshold, it indicates that the current electricity quantity of the first terminal is about to be fully charged or in a fully charged state. For example, a value corresponding to the first electricity quantity threshold may be set to 80% of a battery capacity. When the current electricity quantity of the first terminal is greater than the first electricity quantity threshold, it indicates that the current electricity quantity of the first terminal is relatively high, reducing the charging power may not affect the normal operations of other modules such as a screen, a system, and a system circuit of the first terminal. Therefore, when it is determined that the current electricity quantity of the first terminal is greater than the first electricity quantity threshold and the Bluetooth communication state is monitored in the abnormal state, it is determined whether the current charge protocol supports to adjust the charging power for charging the first terminal to the first charging power, so that the charging power for charging the first terminal is adjusted timely, and the interference of the charging power on Bluetooth communication may be avoided or reduced while ensuring the normal charging of the first terminal.

At block S3032, when the current power of the first terminal is less than a second power threshold and the monitored Bluetooth communication state is in the abnormal state, a communication interface circuit based on the Bluetooth communication between the first terminal is initialized on a basis of a retry mechanism.

In the embodiment of the present disclosure, the retry mechanism is a mechanism for uploading data to a remote storage service and doing other operations in a case of returning successful processing. To avoid the Bluetooth communication itself between the first terminal and the second terminal occurring abnormally or avoid affecting the charging power caused by mis-adjustment of the charge protocol, the SlimBus interface may be initialized through the retry mechanism to clarify a reason for abnormal Bluetooth communication between the first terminal and the second terminal.

In the embodiment of the present disclosure, a second electricity quantity threshold is configured to determine whether the current electricity quantity of the first terminal is a relatively low electricity quantity. In the process of charging the first terminal, when the current electricity quantity of the first terminal is less than the second electricity quantity threshold, it indicates that the current charging electricity quantity of the first terminal is low, and a high-power charging power is required for charging to ensure that the screen, the system and the system circuit module of the first terminal may be operated normally. At this time, when the charging power for charging the first terminal is reduced, it is easily caused invalid charging of the first terminal, so that the charging electronic quantity of the first terminal may not be increased, which affects the user experience. In order to avoid the invalid charging of the first terminal and prevent overhigh charging power from affecting the Bluetooth communication between the first terminal and the second terminal, the SlimBus bus of the first terminal based on the Bluetooth communication may be initialized based on the retry mechanism, so as to restore the normal operation of the communication interface circuit based on the Bluetooth communication. In one example, in the process of restoring the communication interface circuit, the communication interface circuit may be further initialized. In another example, during the process of initializing the SlimBus bus interface, the SlimBus bus interface may be initialized in a way of a software, a hardware or a combination of a hardware and a software. It should to be noted that, the first electricity quantity threshold is greater than the second electricity quantity threshold, for example, a range of the first electricity quantity threshold is 80%-95%, and a range of the second electricity quantity threshold is 10%-20%.

At block S204, when the current charge protocol supports to adjust the charging power for charging the first terminal to the first charging power, the charging power for charging the first terminal is adjusted to the first charging power based on the current charge protocol.

At block S205, when the current charge protocol does not support to adjust the charging power for charging the first terminal to the first charging power, a charge protocol supporting the first charging power is determined based on a charging detection sequence corresponding to the charge protocol supported by the first terminal, and the charging power for charging the first terminal is adjusted to the first charging power based on the charge protocol supporting the first charging power.

In the above embodiment, the charging power for charging the first terminal is adjusted based on the current electricity quantity of the first terminal, which helps to meet charging requirements of the first terminal and avoids or reduces the interference of the charging power on the Bluetooth communication.

Based on the same concept, the embodiments of the present disclosure further provide another charging control method.

Figure 5:
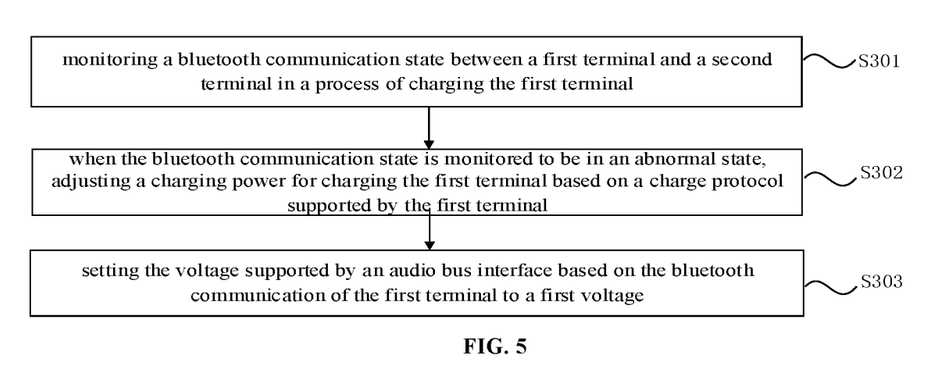
FIG. 5 is a flowchart illustrating a charging control method according to yet another embodiment of the present disclosure.

FIG. 5 is a flowchart illustrating a charging control method according to another example embodiment of the present disclosure. As illustrated in FIG. 5, the charging control method is applicable for a first terminal, and includes the following blocks.

In the embodiment of the present disclosure, the implementations of block S301 and block S302 may be the same with that of the above block S101 and block S102, which are not repeated here.

At block S301, the Bluetooth communication state between the first terminal and the second terminal is monitored in the process of charging the first terminal.

At block S302, when the Bluetooth communication state is monitored in the abnormal state, the charging power for charging the first terminal is adjusted based on the charge protocol supported by the first terminal.

At block S303, a voltage supported by an audio bus interface of the first terminal based on the Bluetooth communication is set to a first voltage.

In the embodiment of the present disclosure, voltage settings supported by the audio bus interface may be a plurality of voltages, for example, 1.2 v or 1.8 v. The first voltage is a voltage higher than a transmission voltage in the plurality of voltages, and the transmission voltage is a voltage before the Bluetooth communication state between the first terminal and the second terminal is switched to the abnormal state from the normal state. When the voltage supported by the audio bus interface of the first terminal based on the Bluetooth communication is set, the supported voltage may be set to the highest voltage among the plurality of voltages. An anti-interference ability of the audio bus interface is enhanced and a fault tolerant scope is expanded, a sampling bit error rate of the SlimBus in the process of charging the first terminal is reduced, and a condition of Bluetooth communication failure caused by parsing fault of the second terminal is prevented.

In an embodiment, when the voltage supported by the audio bus interface is 1.2 v, the corresponding fault tolerance range is 1.2*(0.9~1.1). When the voltage supported by the audio bus interface is 1.8 v, the corresponding fault tolerance range is 1.8*(0.9~1.1). In order to enhance the anti-interference ability of the audio bus interface, the voltage supported by the audio bus interface may be set to 1.8 v.

Based on the same concept, the embodiments of the present disclosure further provide a charging control method.

Figure 6:
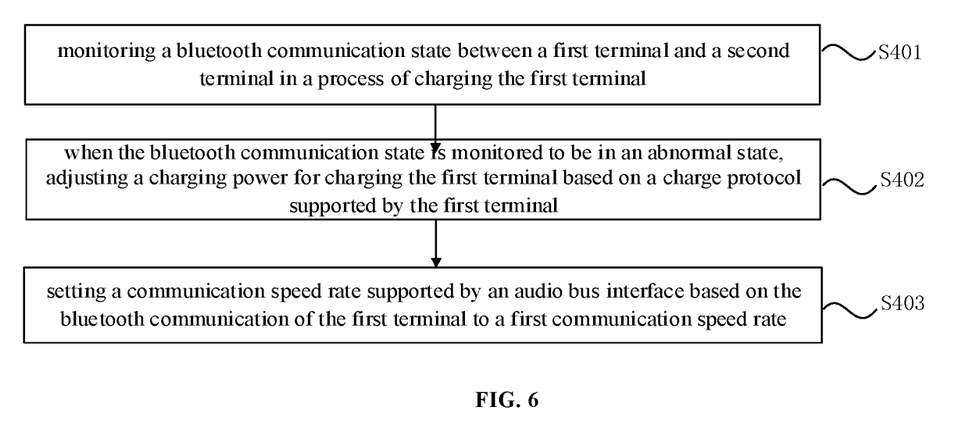
FIG. 6 is a flowchart illustrating a charging control method according to still another embodiment of the present disclosure.

FIG. 6 is a flowchart illustrating a charging control method according to another example embodiment. As illustrated in FIG. 6, the charging control method is applicable for a first terminal, and includes the following blocks.

In the embodiment of the present disclosure, the implementation of block S401 and block S402 may be the same with that of the above block S101 and block S102, which are not repeated here.

At block S401, the Bluetooth communication state between the first terminal and the second terminal is monitored in the process of charging the first terminal.

At block S402, when the Bluetooth communication state is monitored in the abnormal state, the charging power for charging the first terminal is adjusted based on the charge protocol supported by the first terminal.

At block S403, a communication speed rate supported by the audio bus interface of the first terminal based on Bluetooth communication is set to a first communication speed rate.

In the embodiment of the present disclosure, the communication speed rates supported by the audio bus interface of the first terminal based on Bluetooth communication may include a plurality of communication speed rates. The higher the communication speed rate is, more easily faults occur when communication transmission is performed. The first communication speed rate is a communication speed rate lower than the transmission communication speed rate among the plurality of communication speed rates, and the transmission communication speed rate is a communication speed rate before the Bluetooth communication state between the first terminal and the second terminal is switched to the abnormal state from the normal state. To enhance the tolerance ability of the audio bus interface when the communication transmission is performed, when the communication speed rate supported by the audio bus interface is set, the minimum communication speed rate in the plurality of communication speed rates may be selected as the communication speed rate supported by the audio bus interface.

By reducing the communication speed rate supported by the audio bus interface, the sampling bit error rate of the SlimBus may be reduced, to prevent the second terminal from failing to communicate due to an error during parsing the received media file.

In one example, the minimum communication speed rate may be the communication speed rate with a smallest sampling cycle among the communication speed rates supported by the audio bus interface. For example, for a 1 Mhz communication speed rate, sampling 1 bit code is taken as a cycle, duration of the sampling cycle is 1 us. When a 500 khz communication speed rate is adopted, sampling 1 bit code is taken as a cycle, the duration of the sampling cycle is 2 us. Compared with a phase of the communication speed rate, the fault tolerance ability of the phase of the communication speed rate with the 2 us sampling cycle duration is stronger than that of the phase of the communication speed rate with the 1 us sampling cycle duration.

In one embodiment, in a condition of monitoring the Bluetooth communication state, when it is detected decoding failure of the audio bus interface, the Bluetooth communication state is determined as in the abnormal state. The decoding failure may include: packet loss or data miscoding occurred in the process of transmitting the data of the media file by the SlimBus bus interface.

In one embodiment, as illustrated in FIG. 1, the internal spatial position of the output path of the charging chip and the line where the Bluetooth communication interface and the SlimBus bus interface are located in the first terminal may include adjacent up to down or adjacent left to right, and the relative positions are close, which may easily affect the transmission capacity of the SlimBus bus interface and leads to the decoding failure of the SlimBus bus interface, further to cause the second terminal to fail to receive the media file transmitted by the first terminal, so that the media file may not be played normally. For the qc2.0 protocol, the qc3.0 protocol, and the PD protocol, the respective charge protocols include high voltage classes and high current classes. Based on an electric field force, an Ampere loop and Faraday's law of electromagnetic induction, presence of microforce on the output path of the Charge IC and the line where the Bluetooth communication interface and the SlimBus bus interface are located, the interference signal will be coupled on the line where the Bluetooth communication interface and SlimBus bus interface are located. In the process of monitoring the playing state of the media file, when the coupled interference signal is detected to cause decoding failure of the media bus interface between the AP and the wireless communication module and cause the second terminal to be silent, it may be determined that the playing state of the media file is monitored to be in the abnormal state.

Through any one of the above methods for charging control, a technical solution is provided for the scenario where the first terminal plays the media file based on the Bluetooth communication with the second terminal at the same time when the first terminal is charged, the experience of first terminal playing music through a Bluetooth while charging is improved and a technical solution is provided for improving the experience of the mobile device.

Based on the same concept, the embodiments of the present disclosure further provide a charging control apparatus applied to the first terminal.

It could be understood that, the charging control apparatus provided in the embodiment of the present disclosure contains hardware structures and/or software modules that execute various functions in order to implement the above functions. In combination with the modules and algorithm steps of the examples described in embodiments of the present disclosure, the embodiments of the present disclosure may be implemented in the form of hardware or a combination of hardware and computer software. Whether a function is executed by hardware or computer software driven by hardware depends on the specific application and design constraints of the technical solution. Those skilled in the art may adopt different methods for each specific application to implement the described functions, but such implementation should not be considered as beyond the scope of the technical solutions of embodiments of the present disclosure.

Figure 7:
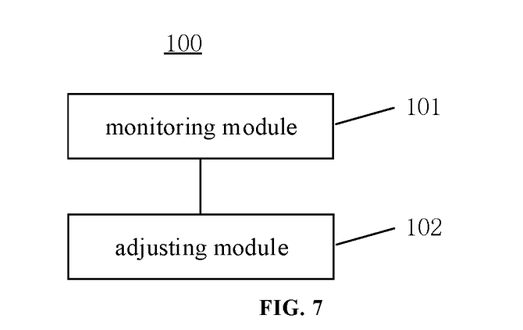
FIG. 7 is a block diagram illustrating a charging control apparatus according to an embodiment of the present disclosure.

FIG. 7 is a block diagram illustrating a charging control apparatus according to an example embodiment of the present disclosure. Referring to FIG. 7, the charging control apparatus 100 includes a monitoring module 101 and an adjusting module 102.

The monitoring module 101 is configured to monitor a Bluetooth communication state between the first terminal and the second terminal in a process of charging the first terminal.

The adjusting module 102 is configured to, when the Bluetooth communication state is monitored to be in an abnormal state, adjust the charging power for charging the first terminal based on the charge protocol supported by the first terminal.

In one embodiment, the adjusting module 102 is configured to: determine whether a current charge protocol supports to adjust the charging power for charging the first terminal to a first charging power, the first charging power being less than a charging power threshold, the charging power threshold being a charging power corresponding to the Bluetooth communication state between the first terminal and the second terminal being in a normal state before switched to the abnormal state from the normal state. When the current charge protocol supports to adjust the charging power for charging the first terminal to the first charging power, the charging power for charging the first terminal is adjusted to the first charging power based on the current charge protocol. When the current charge protocol does not support to adjust the charging power for charging the first terminal to the first charging power, determine that a charge protocol supporting the first charging power based on a charging detection sequence corresponding to the charge protocol supported by the first terminal, and the charging power for charging the first terminal is adjusted to the first charging power based on the charge protocol supporting the first charging power.

In another embodiment, the adjusting module 102 is configured to: when the current charge protocol is a charge protocol supporting a plurality of voltage classes, and a voltage class corresponding to the first charging power exists among the plurality of voltage classes, fixing the voltage class to a voltage class corresponding to the first charging power.

In another embodiment, the adjusting module 102 is configured to: when the current charge protocol is a programmable quick charge protocol, adjust the charging power for charging the first terminal to the first charging power by adjusting a charging voltage of the first terminal to a first charging voltage, and/or adjusting a charging current for charging the first terminal to a first charging current. The first charging voltage is less than a charging voltage threshold, and the first charging current is less than a charging current threshold, the charging voltage threshold and the charging current threshold being a charging voltage and a charging current corresponding to the Bluetooth communication state between the first terminal and the second terminal being in the normal state before switched to the abnormal state from the normal state.

In another embodiment, the apparatus 100 for charge control further includes: a determining module, configured to determine that the current electricity quantity of the first terminal is greater than or equal to an electricity quantity threshold; an initializing module, configured to when the current electricity quantity of the first terminal is less than a second electricity quantity threshold, initialize a communication interface circuit based on Bluetooth communication of the first terminal on a basis of a retry mechanism. The adjusting module is further configured to, when the current electricity quantity of the first terminal is greater than a first electricity quantity threshold, determine whether the current charge protocol supports to adjust the charging power for charging the first terminal to the first charging power. The first electricity quantity threshold is greater than the second electricity quantity threshold, for example, a range of the first electricity quantity threshold may be 80%~95%, and a range of the second electricity quantity threshold may be 10%~20%.

In another embodiment, the charging control apparatus 100 further includes: a first setting module, configured to set the voltage supported by an audio bus interface based on the Bluetooth communication of the first terminal to a first voltage, in which, the audio bus interface supports a plurality of voltages, the first voltage being a voltage higher than a transmission voltage among the plurality of voltages, and the transmission voltage being a voltage before the Bluetooth communication state between the first terminal and the second terminal is switched to the abnormal state from the normal state.

In another embodiment, the apparatus 100 for charge control further includes: a second setting module, configured to set a communication speed rate supported by an audio bus interface based on the Bluetooth communication of the first terminal to a first communication speed rate, in which, the audio bus interface supports a plurality of communication speed rates, the first communication speed rate being a communication speed rate lower than the transmission communication speed rate among the plurality of communication speed rates, and the transmission communication speed rate being a communication speed rate before the Bluetooth communication state between the first terminal and the second terminal is switched to the abnormal state from the normal state.

In another embodiment, the monitoring module 101 the monitoring module is configured to: when the audio bus interface is detected decoding failure, determining that the Bluetooth communication state is monitored in the abnormal state.

With regard to the apparatus in the above embodiments, the specific way in which each module performs the operation has been described in detail in the embodiments of the method and will not be elaborated here.

Figure 8:
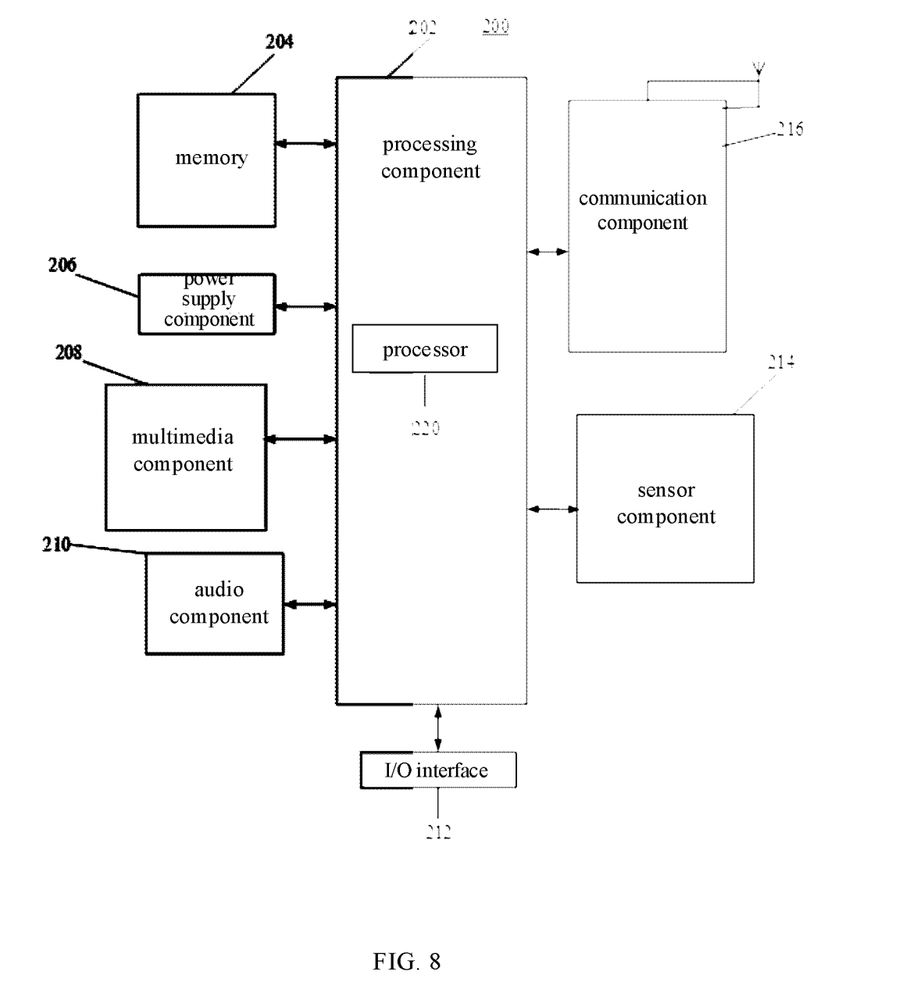
FIG. 8 is a block diagram illustrating an electronic device according to an embodiment of the present disclosure.

FIG. 8 is a block diagram illustrating an electronic device according to an example embodiment. For example, the electronic device 200 may include the above charging control apparatus, to implement any one charging control method described above. The electronic device 200 may be a mobile phone, a computer, a digital broadcasting terminal, a messaging device, a game console, a tablet device, a medical equipment, a fitness equipment, a personal digital assistant, etc.

Referring to FIG. 8, the electronic device 200 may include one or more components: a processing component 202, a memory 204, a power supply component 206, a multimedia component 208, an audio component 210, an input/output (I/O) interface 212, a sensor component 214, and a communication component 216.

The processing component 202 generally controls the whole operation of the electronic device 200, such as the operations related to display, phone call, data communication, camera operation and recording operation. The processing component 202 may include one or more processors 220 to perform instructions, to complete all or part of blocks of the above method. In addition, the processing component 202 may include one or more modules for the convenience of interaction between the processing component 202 and other components. For example, the processing component 202 may include a multimedia module for the convenience of interaction between the multimedia component 208 and the processing component 202.

The memory 204 is configured to store all types of data to support the operation of the electronic device 200. Examples of the data include the instructions of any applications or methods operated on the electronic device 200, contact data, phone book data, messages, pictures, videos, etc. The memory 204 may be implemented by any type of volatile or non-volatile storage devices or their combination, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), Magnetic Memory, Flash Memory, Magnetic Disk or Optical Disk.

The power supply component 206 may provide power for all components of the electronic device 200. The power supply component 206 may include power supply management system, one or more power supplies, and other units related to generating, managing and distributing power for the electronic device 200.

The multimedia component 208 includes an output interface screen provided between the electronic device 200 and the user. In some embodiments, a screen may include a liquid crystal display (LCD) and a touch panel(TP). If the screen includes a touch panel, the screen may be implemented as a touch screen to receive input signals from the user. The touch panel includes one or more touch sensors to sense touching, sliding and gestures on the touch panel. The touch sensor may not only sense the boundary of touch or slide action, but also detect the duration and pressure related to the touching or sliding operation. In some embodiments, the multimedia component 208 include a front camera and/or a rear camera. When the electronic device 200 is in operation mode, such as shooting mode or video mode, the front camera or the rear camera may receive the external multimedia data. Each front camera and rear camera may be a fixed optical lens system or an optical lens system with focal length and optical zoom capacity.

The audio component 210 is configured as output and/or input signal. For example, the audio component 210 includes a microphone (MIC). When the electronic device 200 is in operation mode, such as call mode, record mode, and speech recognition mode, the microphone is configured to receive the external audio signals. The audio signals received may be further stored in the memory 204 or sent via the communication component 216. In some embodiments, the audio component 210 further includes a speaker configured to an output audio signal.

The I/O interface 212 provides an interface for the processing component 202 and the peripheral interface module, and the peripheral interface module may be a keyboard, a click wheel, a button, etc. The buttons may include but not limited to a home button, a volume button, a start button and a lock button.

The sensor component 214 includes one or more sensors, configured to provide various aspects of status assessment for the electronic device 200. For example, the sensor component 214 may detect the on/off state of the electronic device 200 and the relative positioning of the component. For example, the component is a display and a keypad of the electronic device 200. The sensor component 214 may further detect the location change of the electronic device 200 or one component of the electronic device 200, the presence or absence of contact between the user and the device 200, the orientation or acceleration/deceleration of the device 200, and the temperature change of the device 200. The sensor component 214 may include a proximity sensor, which is configured to detect the existence of the objects nearby without any physical contact. The sensor component 214 may further include a light sensor such as CMOS or CCD image sensor, which is configured to use in imaging applications. In some embodiments, the sensor component 214 may further include an acceleration transducer, a gyroscope sensor, a magnetic sensor, a pressure sensor or a temperature sensor.

The communication component 216 is configured for the convenience of wire or wireless communication between the electronic device 200 and other devices. The electronic device 200 may access wireless networks based on communication standard, such as Wi-Fi, 2G or 3G, or their combination. In an exemplary embodiment, the communication component 216 receives broadcast signals or broadcast-related information from an external broadcast management system via a broadcast channel. In an exemplary embodiment, the communication component 216 further includes a near field communication (NFC) module to facilitate short-range communication. For example, an NFC module may be implemented based on radio frequency identification (RFID) technology, infrared data association (IRDA) technology, ultra-wideband (UWB) technology, Bluetooth (BT) technology and other technologies.

In an exemplary embodiment, the electronic device 200 may be implemented by one or more application specific integrated circuits(ASIC), digital signal processors (DSP), digital signal processing devices (DSPD), programmable logic devices (PLD), field programmable gate arrays (FPGA), controllers, microcontrollers, microprocessors or other electronics components, which is configured to perform the above charging control method.

In an exemplary embodiment, a non-temporary computer readable storage medium is further provided which includes instructions, such as the memory 204 including instructions, in which the instructions may be executed by the processor 220 of the electronic device 200 to complete the above methods. For example, the non-temporary computer readable storage medium may be a ROM, a random access memory (RAM), a CD-ROM, a magnetic tape, a floppy disk, an optical data storage device, etc.

Figure 9:
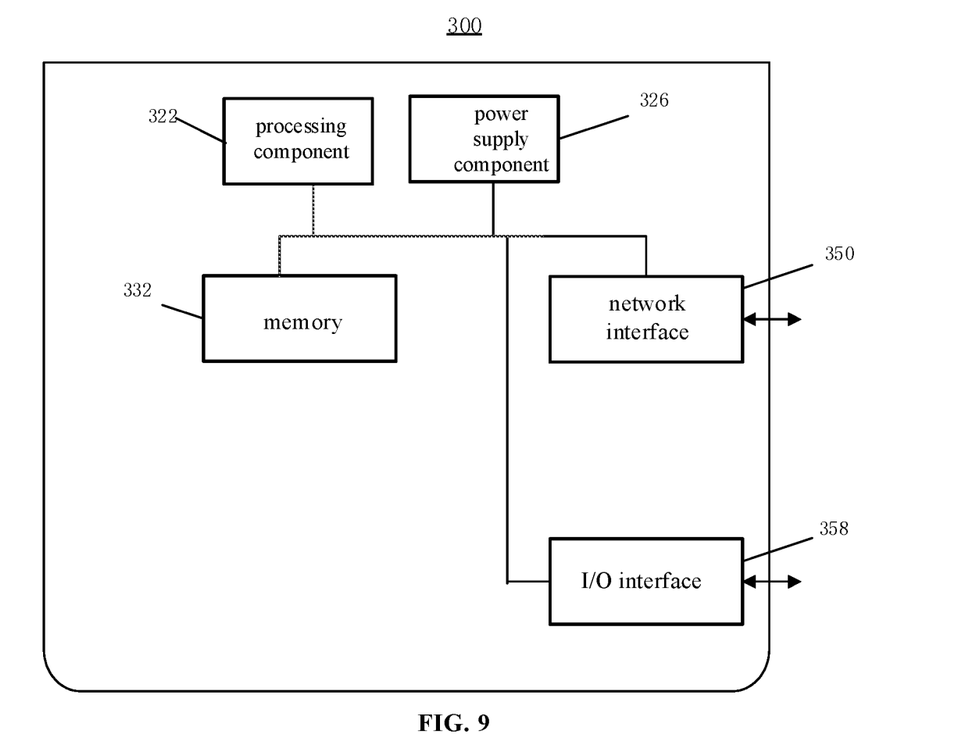
FIG. 9 is a block diagram illustrating a charging control apparatus according to another embodiment of the present disclosure.

FIG. 9 is a block diagram illustrating an apparatus 300 for charge control according to an example embodiment. For example, the apparatus 300 for charge control may be provided as a server. Referring to FIG. 9, the apparatus 300 for charge control includes a processing component 322, which further include one or more processors, and memory resources represented by the memory 332, which are configured to store instructions executed by the processing component 322, for example, an application. The applications stored in the memory 332 may include one or more modules each of which corresponds to a set of instructions. In addition, the processing component 322 is configured to execute instructions, to execute any one charging control method described above.

The apparatus 300 for charge control may further include one power supply component 326 configured to execute power management of the apparatus 300 for charge control, and one wired or wireless network interface 350 configured to connect the apparatus 300 to a network, and one input/output(I/O) interface 358. The apparatus 300 for charge control May operate an operating system stored in the memory 332, for example, Windows Server™, Mac OS X™, Unix™, Linux™, FreeBSD™.

It may be further understood that, "a plurality of" in the present disclosure means two or above, which is similar to other quantifiers. "and/or", describes the relationship of the association objects, indicating that there may exist three relationships, for example, A and/or B, may represent: any of existing A only, existing both A and B, or existing B only. The character "/" generally means the contextual object is a kind of "or" relationship. The singular forms "a", "the" and "said are also intended to include plural forms, unless the context clearly indicates otherwise.

It should be further understood that, although the terms "first", "second", "third", etc. may be configured to describe various information, such information shall not be limited to these terms. These terms are only used to distinguish the same type of information, rather than indicate a particular order or importance degree. In fact, "first", "second" and other similar descriptions may be used interchangeably. For example, subject to the scope of this present disclosure, first information may also be referred to as second information, and similarly, and second information may also be referred to as first information.

It is further understandable that, unless specifically stated otherwise, a "connection" includes a direct connection between the two without other components, or an indirect connection between the two with other components.

It may be further understood that, even though operations are described in the drawings in a particular order, it should not be understood as requiring that such operations be performed in the particular order shown or in sequential order, or that all illustrated operations be performed to obtain desirable results. In certain circumstances, multitasking and parallel processing may be advantageous.

After considering the specification and practicing the disclosure herein, those skilled in the art will easily think of other implementations. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope and spirit of the present disclosure are given by the appended claims.

It should be understood that the present disclosure is not limited to the precise structure described above and shown in the drawings, and various modifications and changes may be made without departing from its scope. The scope of the present application is only limited by the appended claims. The scope of the present application is only limited by the appended claims.

What is claimed is:

1. A charging control method, applicable for a first terminal, and comprising:
    monitoring a Bluetooth communication state between a first terminal and a second terminal in a process of charging the first terminal;
    when the Bluetooth communication state is monitored to be in an abnormal state, adjusting a charging power for charging the first terminal based on a charge protocol supported by the first terminal;
    setting a voltage supported by an audio bus interface based on the Bluetooth communication of the first terminal to a first voltage, wherein, the audio bus interface supports a plurality of voltages, the first voltage being a voltage higher than a transmission voltage among the plurality of voltages, and the transmission voltage being a voltage before the Bluetooth communication state between the first terminal and the second terminal is switched to the abnormal state from a normal state.

2. The method of claim 1, wherein, adjusting the charging power for charging the first terminal based on the charge protocol supported by the first terminal, comprises:
    determining whether a current charge protocol supports to adjust the charging power for charging the first terminal to a first charging power, the first charging power being less than a charging power threshold, the charging power threshold being a charging power corresponding to the Bluetooth communication state between the first terminal and the second terminal being in a normal state before switched to the abnormal state from the normal state;
    when the current charge protocol supports to adjust the charging power for charging the first terminal to the first charging power, adjusting the charging power for charging the first terminal to the first charging power based on the current charge protocol;
    when the current charge protocol does not support to adjust the charging power for charging the first terminal to the first charging power, determining a charge protocol supporting the first charging power based on a charging detection sequence corresponding to the charge protocol supported by the first terminal, and adjusting the charging power for charging the first terminal to the first charging power based on the charge protocol supporting the first charging power.

3. The method of claim 2, wherein, adjusting the charging power for charging the first terminal to the first charging power, comprises:
    when the current charge protocol is a charge protocol supporting a plurality of voltage classes, and a voltage class corresponding to the first charging power exists among the plurality of voltage classes, adjusting a voltage class to a voltage class corresponding to the first charging power.

4. The method of claim 2, wherein, adjusting the charging power for charging the first terminal to the first charging power, comprises:
    when the current charge protocol is a programmable quick charge protocol, adjusting the charging power for charging the first terminal to the first charging power by adjusting a charging voltage of the first terminal to a first charging voltage, and/or adjusting a charging current for charging the first terminal to a first charging current;
    the first charging voltage being less than a charging voltage threshold, the first charging current being less than a charging current threshold, and the charging voltage threshold and the charging current threshold being respectively a charging voltage and a charging current corresponding to the Bluetooth communication state between the first terminal and the second terminal being in the normal state before switched to the abnormal state from the normal state.

5. The method of claim 2, further comprising:
determining a current electricity quantity of the first terminal;
when the current electricity quantity of the first terminal is greater than a first electricity quantity threshold and the monitored Bluetooth communication state is in the abnormal state, determining whether the current charge protocol supports to adjust the charging power for charging the first terminal to the first charging power;
when the current electricity quantity of the first terminal is less than a second electricity quantity threshold and the monitored Bluetooth communication state is in the abnormal state, initializing a communication interface circuit based on Bluetooth communication of the first terminal on a basis of a retry mechanism;
wherein, the first electricity quantity threshold being greater than the second electricity quantity threshold.

6. The method of claim 1, further comprising:
setting a communication speed rate supported by an audio bus interface based on the Bluetooth communication of the first terminal to a first communication speed rate, wherein, the audio bus interface supports a plurality of communication speed rates, the first communication speed rate being a communication speed rate lower than a transmission communication speed rate among the plurality of communication speed rates, and the transmission communication speed rate being a communication speed rate before the Bluetooth communication state between the first terminal and the second terminal is switched to the abnormal state from the normal state.

7. The method of claim 1, wherein, monitoring that the Bluetooth communication state is in the abnormal state, comprises:
when detecting decoding failure of the audio bus interface, determining that the Bluetooth communication state is monitored in the abnormal state.

8. An electronic device, comprising:
a memory, configured to store instructions; and
a processor, configured to call the instructions stored in the memory to execute a charging control method, and the processor is configured to:
monitor a Bluetooth communication state between a first terminal and a second terminal in a process of charging the first terminal;
when the Bluetooth communication state is monitored to be in an abnormal state, adjust a charging power for charging the first terminal based on a charge protocol supported by the first terminal;
wherein the processor is configured to: set a voltage supported by an audio bus interface based on the Bluetooth communication of the first terminal to a first voltage, wherein, the audio bus interface supports a plurality of voltages, the first voltage being a voltage higher than a transmission voltage among the plurality of voltages, and the transmission voltage being a voltage before the Bluetooth communication state between the first terminal and the second terminal is switched to the abnormal state from a normal state.

9. The electronic device of claim 8, wherein, the processor is configured to:
determine whether a current charge protocol supports to adjust the charging power for charging the first terminal to a first charging power, the first charging power being less than a charging power threshold, the charging power threshold being a charging power corresponding to the Bluetooth communication state between the first terminal and the second terminal being in a normal state before switched to the abnormal state from the normal state;
when the current charge protocol supports to adjust the charging power for charging the first terminal to the first charging power, adjust the charging power for charging the first terminal to the first charging power based on the current charge protocol;
when the current charge protocol does not support to adjust the charging power for charging the first terminal to the first charging power, determine a charge protocol supporting the first charging power based on a charging detection sequence corresponding to the charge protocol supported by the first terminal, and adjust the charging power for charging the first terminal to the first charging power based on the charge protocol supporting the first charging power.

10. The electronic device of claim 9, wherein, the processor is configured to:
when the current charge protocol is a charge protocol supporting a plurality of voltage classes, and a voltage class corresponding to the first charging power exists among the plurality of voltage classes, adjust a voltage class to a voltage class corresponding to the first charging power.

11. The electronic device of claim 9, wherein, the processor is configured to:
when the current charge protocol is a programmable quick charge protocol, adjust the charging power for charging the first terminal to the first charging power by adjusting a charging voltage of the first terminal to a first charging voltage, and/or adjust a charging current for charging the first terminal to a first charging current;
the first charging voltage being less than a charging voltage threshold, the first charging current being less than a charging current threshold, and the charging voltage threshold and the charging current threshold being respectively a charging voltage and a charging current corresponding to the Bluetooth communication state between the first terminal and the second terminal being in the normal state before switched to the abnormal state from the normal state.

12. The electronic device of claim 9, wherein the processor is configured to:
determine a current electricity quantity of the first terminal;
when the current electricity quantity of the first terminal is greater than a first electricity quantity threshold and the monitored Bluetooth communication state is in the abnormal state, determine whether the current charge protocol supports to adjust the charging power for charging the first terminal to the first charging power;
when the current electricity quantity of the first terminal is less than a second electricity quantity threshold and the monitored Bluetooth communication state is in the abnormal state, initialize a communication interface circuit based on Bluetooth communication of the first terminal on a basis of a retry mechanism;

wherein, the first electricity quantity threshold being greater than the second electricity quantity threshold.

13. The electronic device of claim 8, wherein the processor is configured to:
   set a communication speed rate supported by an audio bus interface based on the Bluetooth communication of the first terminal to a first communication speed rate, wherein, the audio bus interface supports a plurality of communication speed rates, the first communication speed rate being a communication speed rate lower than a transmission communication speed rate among the plurality of communication speed rates, and the transmission communication speed rate being a communication speed rate before the Bluetooth communication state between the first terminal and the second terminal is switched to the abnormal state from the normal state.

14. The electronic device of claim 8, wherein the processor is configured to:
   when detecting decoding failure of the audio bus interface, determine that the Bluetooth communication state is monitored in the abnormal state.

15. A computer readable storage medium with instructions stored thereon, wherein the instructions execute a charging control method, and the method4*nc*-tudes comprises:
   monitoring a Bluetooth communication state between a first terminal and a second terminal in a process of charging the first terminal;
   when the Bluetooth communication state is monitored to be in an abnormal state, adjusting a charging power for charging the first terminal based on a charge protocol supported by the first terminal;
   setting a voltage supported by an audio bus interface based on the Bluetooth communication of the first terminal to a first voltage, wherein, the audio bus interface supports a plurality of voltages, the first voltage being a voltage higher than a transmission voltage among the plurality of voltages, and the transmission voltage being a voltage before the Bluetooth communication state between the first terminal and the second terminal is switched to the abnormal state from a normal state.

16. The storage medium of claim 15, wherein, adjusting the charging power for charging the first terminal based on the charge protocol supported by the first terminal, comprises:
   determining whether a current charge protocol supports to adjust the charging power for charging the first terminal to a first charging power, the first charging power being less than a charging power threshold, the charging power threshold being a charging power corresponding to the Bluetooth communication state between the first terminal and the second terminal being in a normal state before switched to the abnormal state from the normal state;
   when the current charge protocol supports to adjust the charging power for charging the first terminal to the first charging power, adjusting the charging power for charging the first terminal to the first charging power based on the current charge protocol;
   when the current charge protocol does not support to adjust the charging power for charging the first terminal to the first charging power, determining a charge protocol supporting the first charging power based on a charging detection sequence corresponding to the charge protocol supported by the first terminal, and adjusting the charging power for charging the first terminal to the first charging power based on the charge protocol supporting the first charging power.

17. The storage medium of claim 16, wherein, adjusting the charging power for charging the first terminal to the first charging power, comprises:
   when the current charge protocol is a charge protocol supporting a plurality of voltage classes, and a voltage class corresponding to the first charging power exists among the plurality of voltage classes, adjusting a voltage class to a voltage class corresponding to the first charging power.

18. The storage medium of claim 16, wherein, adjusting the charging power for charging the first terminal to the first charging power, comprises:
   when the current charge protocol is a programmable quick charge protocol, adjusting the charging power for charging the first terminal to the first charging power by adjusting a charging voltage of the first terminal to a first charging voltage, and/or adjusting a charging current for charging the first terminal to a first charging current;
   the first charging voltage being less than a charging voltage threshold, the first charging current being less than a charging current threshold, and the charging voltage threshold and the charging current threshold being respectively a charging voltage and a charging current corresponding to the Bluetooth communication state between the first terminal and the second terminal being in the normal state before switched to the abnormal state from the normal state.

* * * * *